(12) United States Patent
    Kitagawa et al.

(10) Patent No.: US 12,684,208 B2
(45) Date of Patent: Jul. 14, 2026

(54) IMAGING APPARATUS

(71) Applicant: Panasonic Intellectual Property Management Co., Ltd., Osaka (JP)

(72) Inventors: Yujiro Kitagawa, Osaka (JP); Yuji Tominaga, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 35 days.

(21) Appl. No.: 18/913,324

(22) Filed: Oct. 11, 2024

(65) Prior Publication Data

US 2025/0133280 A1    Apr. 24, 2025

(30) Foreign Application Priority Data

Oct. 18, 2023    (JP) ................................. 2023-179758

(51) Int. Cl.
    *H04N 23/51*        (2023.01)
    *H04N 23/52*        (2023.01)
    *H04N 23/54*        (2023.01)

(52) U.S. Cl.
    CPC ............. *H04N 23/51* (2023.01); *H04N 23/52* (2023.01); *H04N 23/54* (2023.01)

(58) Field of Classification Search
    CPC ........ H04N 23/51; H04N 23/52; H04N 23/54; H05K 7/20
    See application file for complete search history.

(56) References Cited

U.S. PATENT DOCUMENTS

| | | | | |
|---|---|---|---|---|
| 2006/0056049 A1* | 3/2006 | Tokiwa | ................ | H04N 23/663 |
| | | | | 348/E5.025 |
| 2019/0163037 A1* | 5/2019 | Koyama | ................ | G03B 17/55 |
| 2020/0037471 A1* | 1/2020 | Kaga | ...................... | H04N 23/52 |
| 2022/0294953 A1 | 9/2022 | Saiki et al. | | |
| 2022/0334455 A1* | 10/2022 | Abe | ......................... | H04N 23/50 |
| 2023/0164408 A1 | 5/2023 | Endo et al. | | |
| 2023/0396863 A1* | 12/2023 | Abe | ...................... | H04N 23/687 |
| 2024/0074115 A1* | 2/2024 | Nagatsu | ............. | H05K 7/20454 |

FOREIGN PATENT DOCUMENTS

| | | |
|---|---|---|
| JP | 2014-116748 A | 6/2014 |
| JP | 2022-140213 A | 9/2022 |
| JP | 2023-077022 A | 6/2023 |

* cited by examiner

*Primary Examiner* — Albert H Cutler

(74) *Attorney, Agent, or Firm* — Renner, Otto, Boisselle & Sklar, LLP

(57)        ABSTRACT

An image capturing device includes: a casing at least partially including a metal part, an outer surface of the casing including at least a part of which is formed by the metal part; a lens mount provided on a front surface of the casing; an image sensor provided inside the casing, the image sensor being positioned rearward of the lens mount; a thermally conductive sheet that transfers heat generated from the image sensor, to the metal part of the casing; and an elastic member biasing the thermally conductive sheet toward an inner surface of the metal part of the casing to maintain contact between the thermally conductive sheet and the inner surface.

6 Claims, 6 Drawing Sheets

IMAGING APPARATUS

BACKGROUND

Technical Field

The present disclosure relates to an imaging apparatus.

Description of the Related Art

For example, JP 2023-077022 A describes an imaging apparatus including an imaging board holder that holds an imaging board (board on which an image sensor is mounted), a duct unit through which air blown by a cooling fan flows, and a thermally conductive sheet including a part affixed to the imaging board holder and another part being in contact with the duct unit. An elastic member biases the other part of the thermally conductive sheet toward the duct unit, whereby contact between the thermally conductive sheet and the duct unit is maintained.

SUMMARY

However, in the case of the imaging apparatus described in JP 2023-077022 A, a heat dissipation member that causes heat of the image sensor to be dissipated to the outside is the duct unit through which air flows, and the duct unit is disposed inside a casing of the imaging apparatus. However, depending on the type of an imaging apparatus, there may be a case in which such a duct unit does not exist, or there may be a case in which a flat surface part having a sufficient size that can be subjected to surface contact with the thermally conductive sheet does not exist in the duct unit. That is, there may be a case in which a heat dissipation member thermally connectable to an image sensor device via a thermally conductive sheet does not exist inside the casing of the imaging apparatus.

Therefore, an object of the present disclosure is to cause heat of an image sensor to be dissipated to an outside of a casing, in an imaging apparatus in which a heat dissipation member thermally connectable to the image sensor via a thermally conductive sheet does not exist inside the casing.

In order to solve the above problem, according to an aspect of the present disclosure, an image capturing device is provided that includes:

a casing at least partially including a metal part, an outer surface of the casing including at least a part of which is formed by the metal part;

a lens mount provided on a front surface of the casing;

an image sensor provided inside the casing, the image sensor being positioned rearward of the lens mount;

a thermally conductive sheet that transfers heat generated from the image sensor, to the metal part of the casing; and an elastic member biasing the thermally conductive sheet toward an inner surface of the metal part of the casing to maintain contact between the thermally conductive sheet and the inner surface.

According to the present disclosure, in an imaging apparatus in which a heat dissipation member thermally connectable to an image sensor via a thermally conductive sheet does not exist inside a casing, it is possible to cause heat of the image sensor to be dissipated to an outside of the casing.

DETAILED DESCRIPTION

Hereinafter, embodiments will be described in detail with reference to the drawings as appropriate. Note however that unnecessarily detailed description may be omitted. For example, detailed description of a well-known matter and repeated description of substantially the same configuration may be omitted. This is to avoid unnecessary redundancy of the following description and to facilitate understanding of those skilled in the art.

Note that the inventor(s) provides the accompanying drawings and the following description in order for those skilled in the art to fully understand the present disclosure, and does not intend to limit the subject matter described in the claims by the accompanying drawings and the following description.

Hereinafter, an imaging apparatus according to an embodiment of the present disclosure will be described with reference to the drawings.

Figure 1:
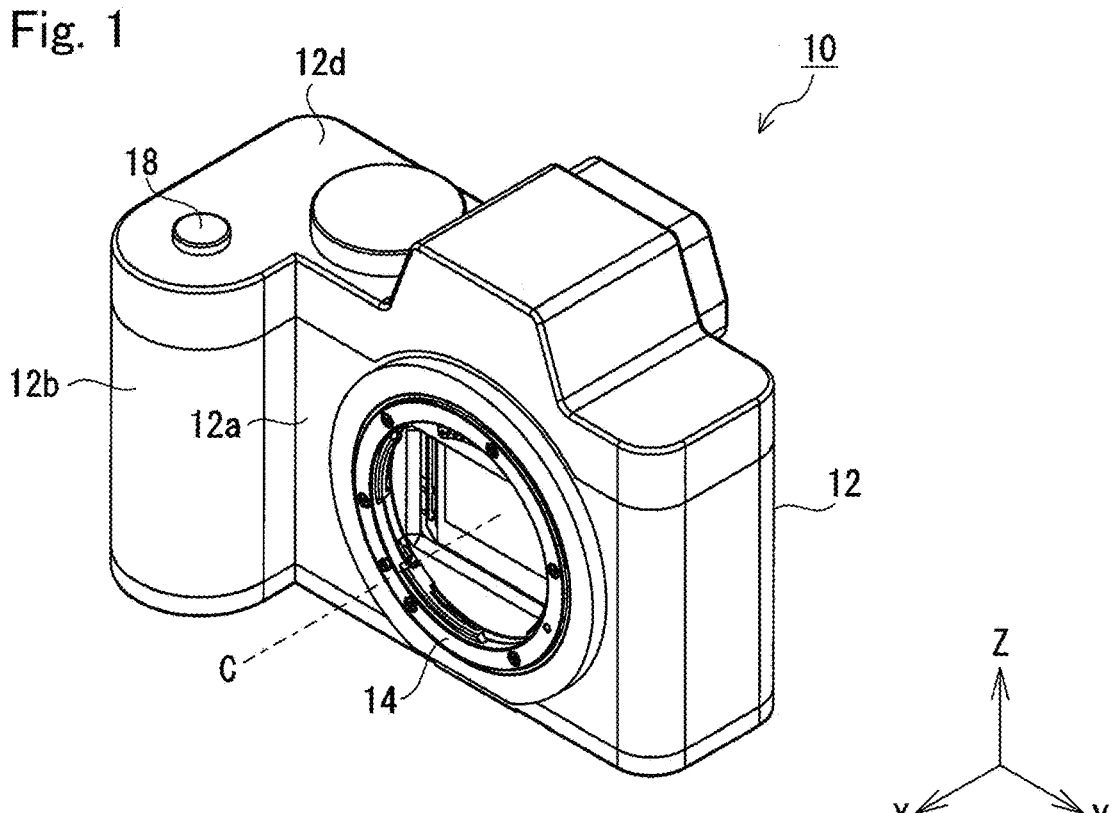
FIG. 1 is a front and upper perspective view of an imaging apparatus according to an embodiment of the present disclosure.
Figure 1:
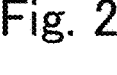
Figure 2:
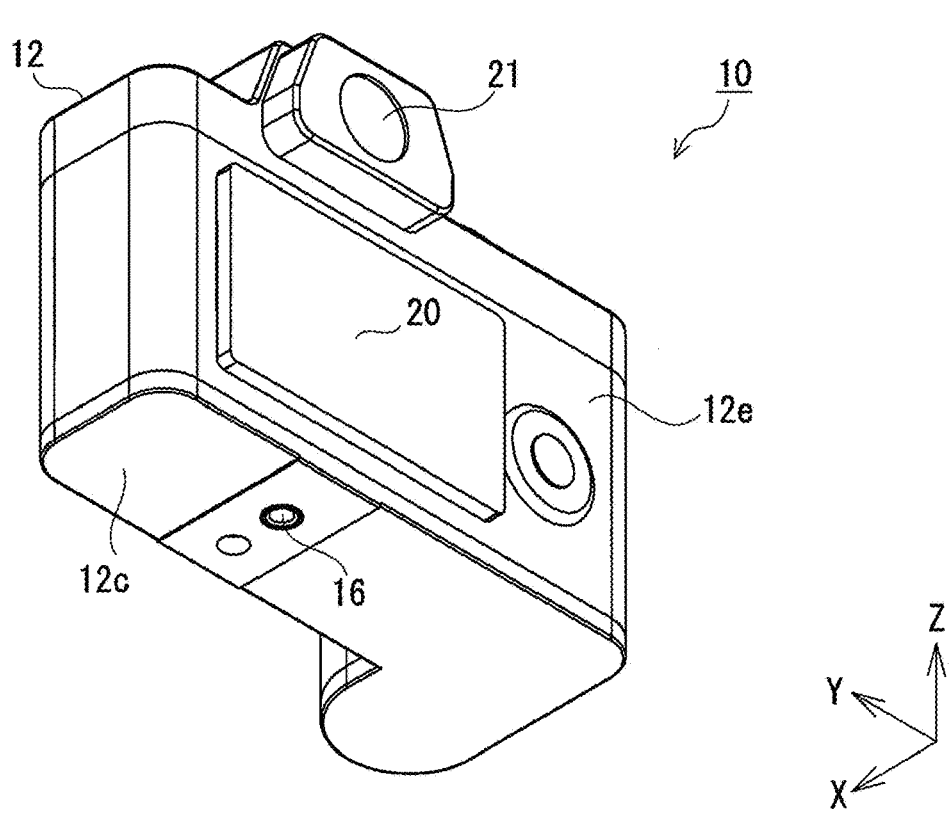
FIG. 2 is a rear and lower perspective view of the imaging apparatus.

FIG. 1 is a schematic front and upper perspective view of an imaging apparatus according to an embodiment of the present disclosure. FIG. 2 is a rear perspective view of the imaging apparatus. Note that an X-Y-Z orthogonal coordinate system illustrated in the drawings is for facilitating understanding of the embodiments of the present disclosure, and does not limit the embodiments of the present disclosure. An X-axis direction is a front-rear direction of the imaging apparatus, a Y-axis direction is a left-right direction, and a Z-axis direction is a height direction. In addition, herein, a side on which a subject of the imaging apparatus is present is defined as a "front side". Further, a "left side" and a "right side" are a "left side" and a "right side" in a case where the imaging apparatus is viewed from the front of the imaging apparatus.

As illustrated in FIGS. 1 and 2, an imaging apparatus 10 according to the present embodiment includes a casing 12 whose outer surface is a design surface, and a lens mount 14 that is provided on a front surface 12a of the casing 12 and to which a lens (not illustrated) is to be detachably mounted. A grip portion to be gripped by the right hand of a user is provided in a left side end portion 12b of the casing 12. A screw hole 16 to which a tripod or the like is to be attached is provided in a bottom surface 12c of the casing 12. A shutter button 18 is provided on a top surface 12d of the casing 12. A monitor 20 and an electronic viewfinder 21 are provided on a rear surface 12e of the casing 12. That is, in the case of the present embodiment, the imaging apparatus 10 has a design similar to the design of a so-called single-lens reflex camera.

In the case of the present embodiment, the casing 12 includes a plurality of members.

Figure 3:
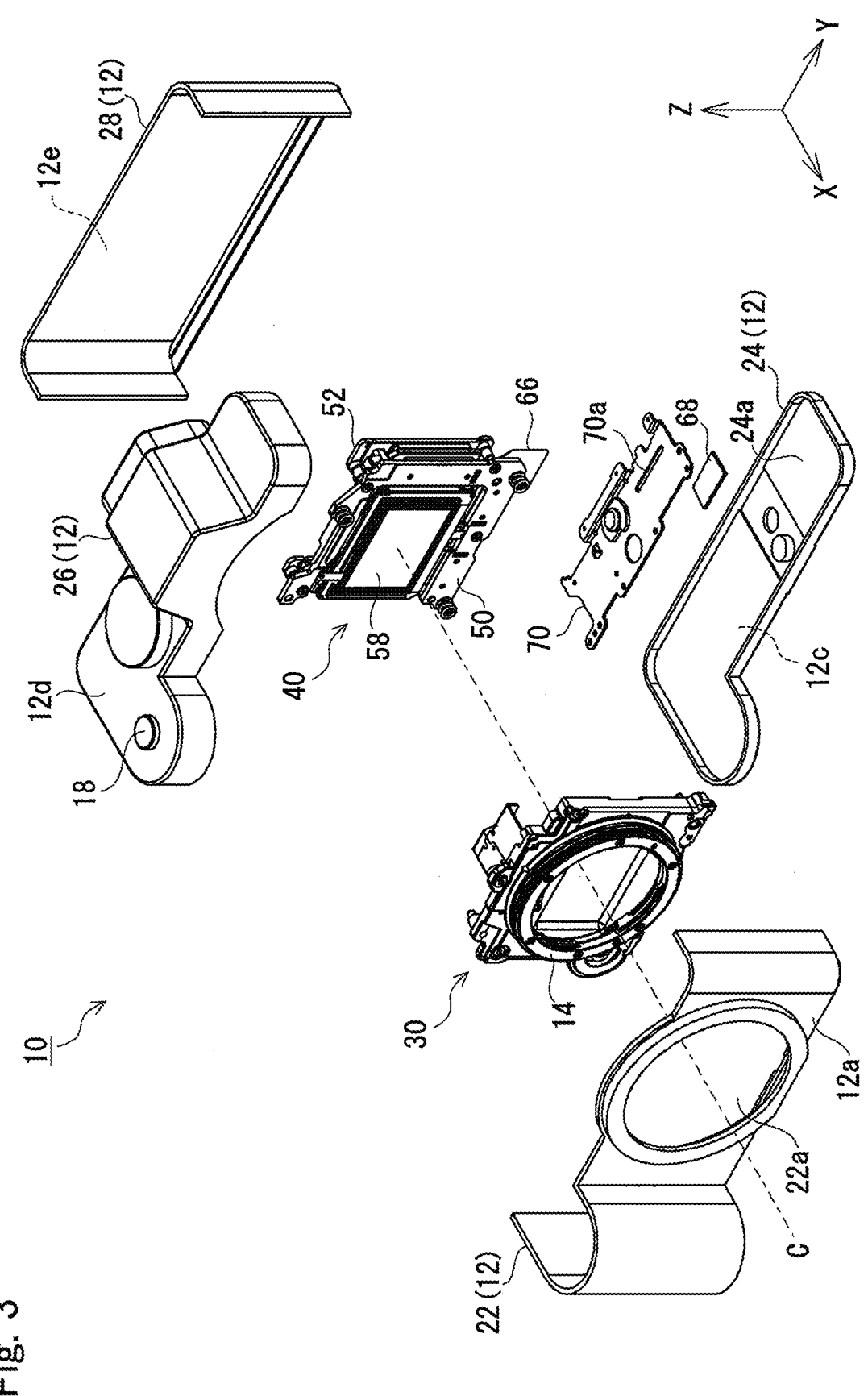
FIG. 3 is an exploded perspective view of the imaging apparatus.

FIG. 3 is an exploded perspective view of the imaging apparatus.

As illustrated in FIG. 3, the casing 12 of the imaging apparatus 10 includes a front casing 22 including the front surface 12*a*, a bottom casing 24 including the bottom surface 12*c*, a top casing 26 including the top surface 12*d*, and a rear casing 28 including the rear surface 12*e*. For repair or the like of the imaging apparatus 10, the front casing 22, the bottom casing 24, the top casing 26, and the rear casing 28 are separable from each other. In the case of the present embodiment, at least the bottom casing 24 is made of, for example, a metal material having high thermal conductivity, such as an aluminum alloy.

As illustrated in FIG. 3, in the case of the present embodiment, a lens mount module 30 and an imaging module 40 are disposed inside the casing 12 of the imaging apparatus 10.

The lens mount module 30 includes the lens mount 14 and a shutter (not illustrated), and is attached to an inner surface of the front casing 22. A through hole 22*a* through which the lens mount 14 passes is formed in the front casing 22.

The imaging module 40 is attached to a rear surface of the lens mount module 30, and includes an image sensor.

Figure 4:
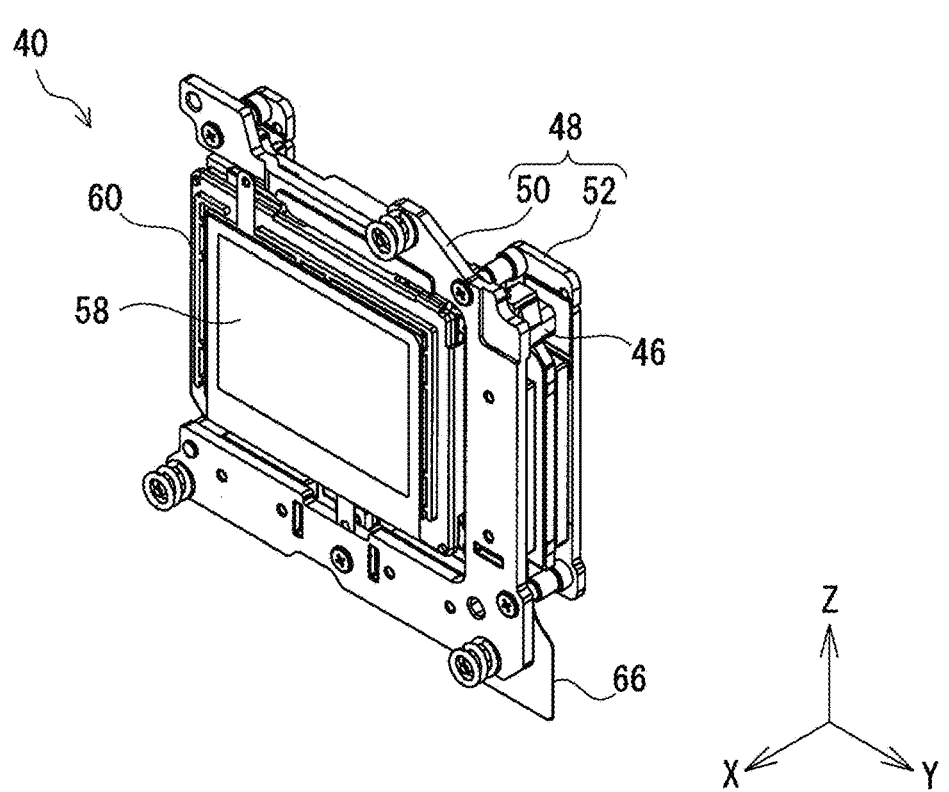
FIG. 4 is a front perspective view of an imaging module in the imaging apparatus.
Figure 5:
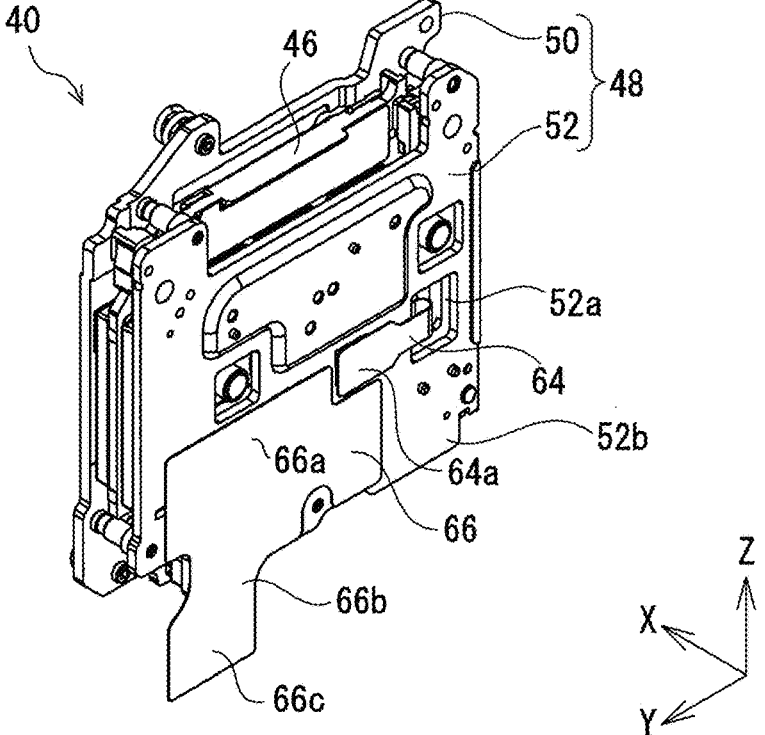
FIG. 5 is a rear perspective view of the imaging module.
Figure 6:
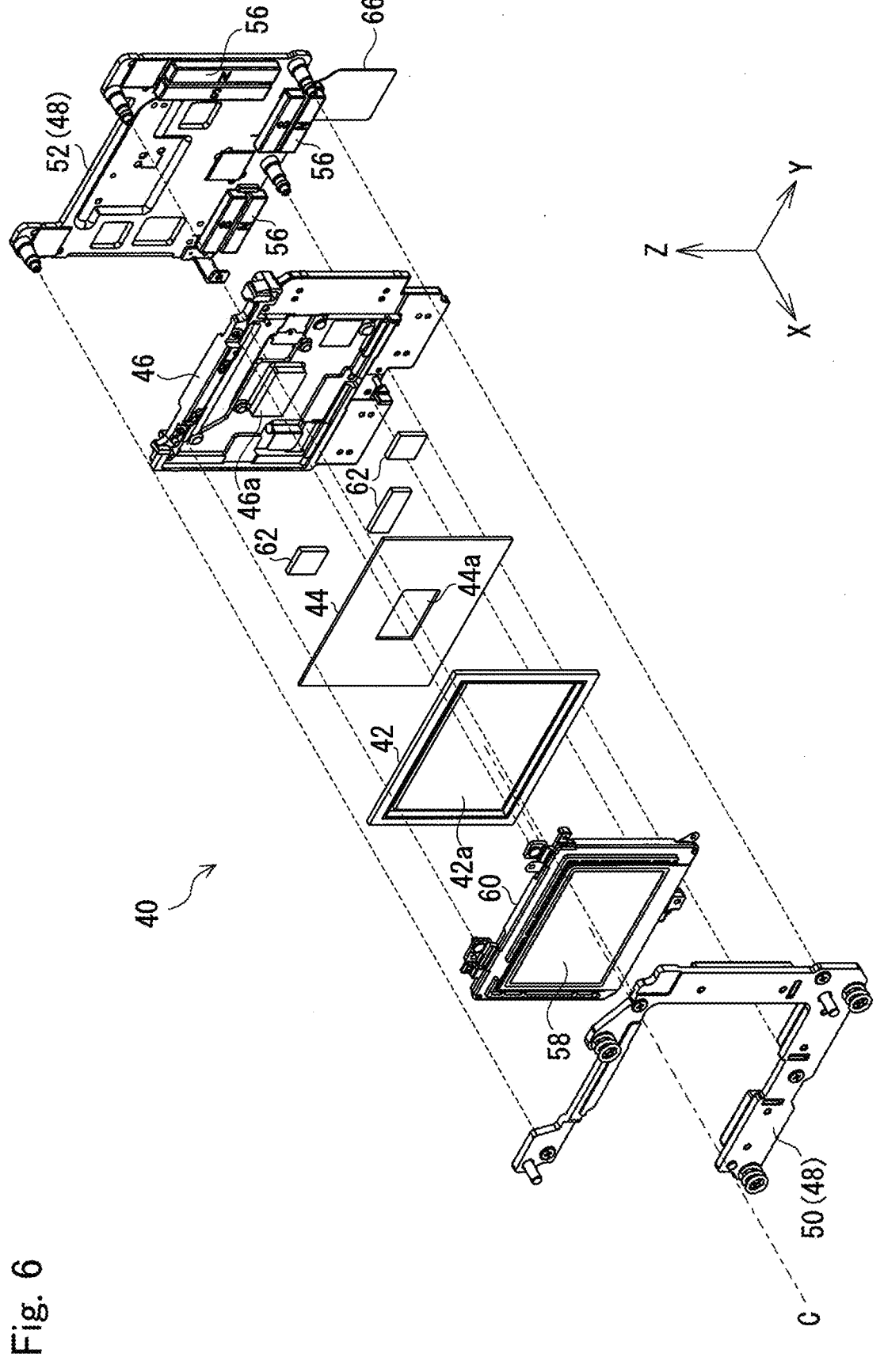
FIG. 6 is a front exploded perspective view of the imaging module.
Figure 7:
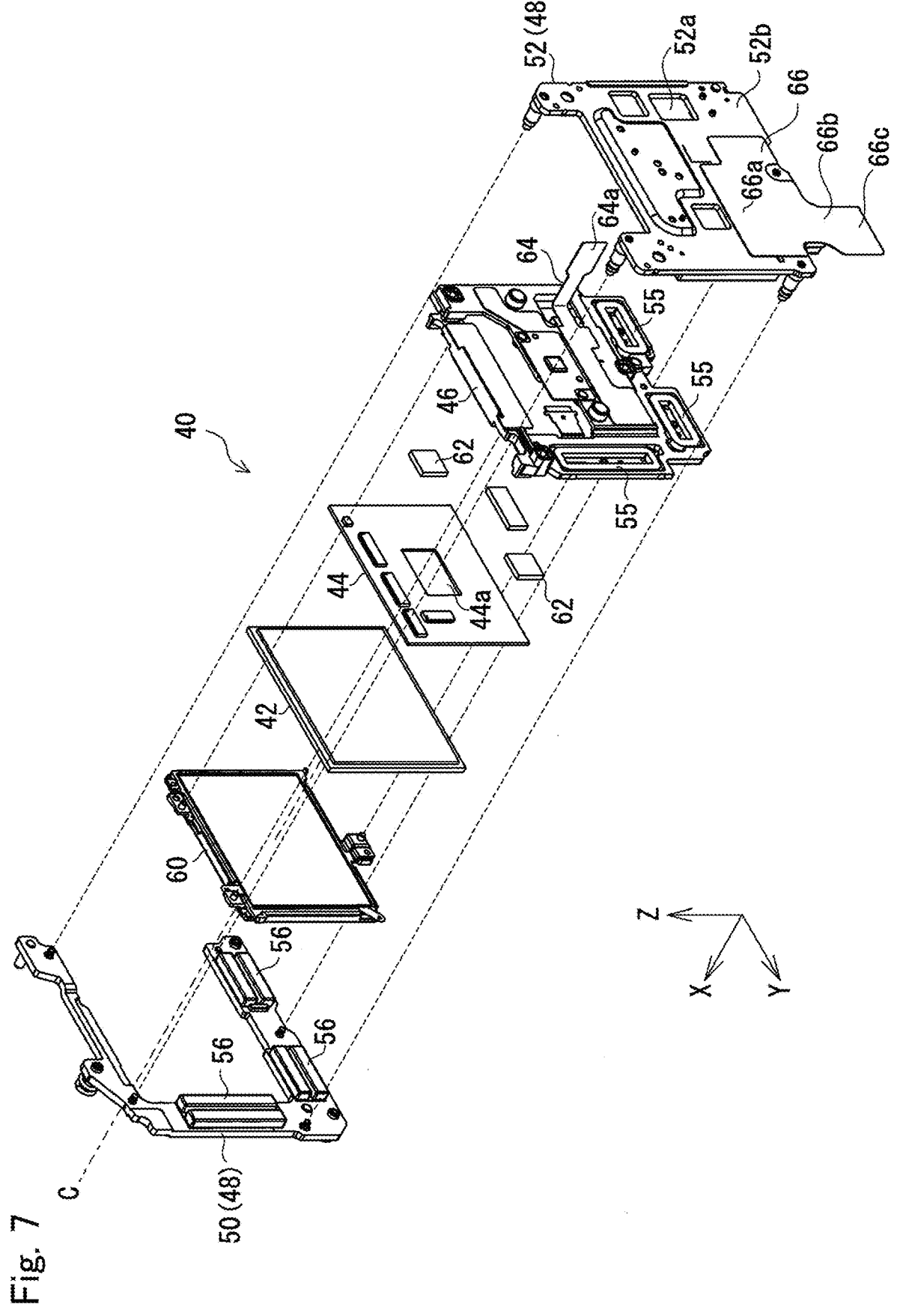
FIG. 7 is a rear exploded perspective view of the imaging module.

FIG. 4 is a front perspective view of the imaging module. FIG. 5 is a rear perspective view of the imaging module. FIG. 6 is a front exploded perspective view of the imaging module. FIG. 7 is a rear exploded perspective view of the imaging module.

As illustrated in FIGS. 4 to 7, the imaging module 40 includes an image sensor 42. The image sensor 42 is a device that receives image light transmitted through the lens (not illustrated) mounted to the lens mount 14 by a light-receiving surface 42*a*, and that converts the received image light into an electric signal. In the case of the present embodiment, the image sensor 42 is mounted on a board (circuit board) 44.

When the imaging module 40 is provided inside the casing 12, the image sensor 42 is arranged rearward of the lens mount 14. Thus, the light-receiving surface 42*a* of the image sensor 42 is arranged on an optical axis C of the lens (not illustrated) mounted to the lens mount 14.

Further, in the case of the present embodiment, the imaging apparatus 10 is configured to be able to execute image stabilization. That is, the imaging module 40 is configured to allow the image sensor 42 to be displaced in a direction orthogonal to the optical axis C such that image blurring does not occur due to vibration of the hand of the user holding the imaging apparatus 10.

Specifically, the imaging module 40 includes a board holder 46 that holds the board 44 on which the image sensor 42 is mounted, and a main base 48 that supports the board holder 46 to allow the board holder 46 to move in the left-right direction (Y-axis direction) and the height direction (Z-axis direction). The main base 48 includes a front frame 50 and a rear frame 52. Each of the board holder 46, the front frame 50, and the rear frame 52 is made of, for example, a metal material having high thermal conductivity, such as an aluminum alloy. Note that the imaging module 40 is fixed to the lens mount module 30 through the front frame 50.

The front frame 50 and the rear frame 52 are fixed to each other, and support the board holder 46 such that the board holder 46 is displaced therebetween. Each of a plurality of coils 55 and a plurality of magnets 56 for displacing the board holder 46 is provided on the board holder 46, the front frame 50, and the rear frame 52. The coil 55 on the board holder 46 is arranged between the magnet 56 on the front frame 50 and the magnet 56 on the rear frame 52. When an electric current flows through the coil 55, the coil 55 is displaced in a magnetic field formed between the magnets 56. As a result, the board holder 46 is displaced, and the image sensor 42 supported by the board holder 46 via the board 44 is displaced.

Further, in the case of the present embodiment, the board holder 46 is provided with a filter unit 60 including a plurality of optical filters such as a protective glass 58 and an infrared cut glass such that the filter unit 60 is positioned in front of the image sensor 42.

In the case of the present embodiment, the image sensor 42 is thermally connected to the board holder 46. Specifically, as illustrated in FIG. 6, a rear surface of the image sensor 42 is in contact with a protrusion 46*a* provided on the board holder 46 and protruding frontward. Heat generated in the image sensor 42 is transferred to the board holder 46 via the protrusion 46*a*. A through hole 44*a* through which the protrusion 46*a* passes is formed in the board 44.

In the case of the present embodiment, the board 44 is also thermally connected to the board holder 46. The board 44 is attached to the board holder 46 via a plurality of thermally conductive sheets 62 having adhesiveness on both surfaces. Heat of the board 44 is transferred to the board holder 46 via the thermally conductive sheet 62.

In the case of the present embodiment, the board holder 46 is thermally connected to the rear frame 52 of the main base 48. As illustrated in FIG. 7, a thin thermally conductive sheet 64 having a thermally conductive property and flexibility is affixed to a rear surface of the board holder 46. The thermally conductive sheet 64 is, for example, a graphite sheet. As illustrated in FIG. 5, a tip end 64*a* of the thermally conductive sheet 64 passes through a through hole 52*a* formed in the rear frame 52, and is affixed to a rear surface 52*b* of the rear frame 52. With the thermally conductive sheet 64 having flexibility, the board holder 46 is thermally connected to the rear frame 52 of the main base 48 while being supported by the main base 48 in a displaceable manner.

As described above, the heat of the image sensor 42 (and the board 44) is transferred to the rear frame 52 of the main base 48. Heat of the rear frame 52 is transferred to the casing 12, and is dissipated from the casing 12 to the outside.

Figure 8:
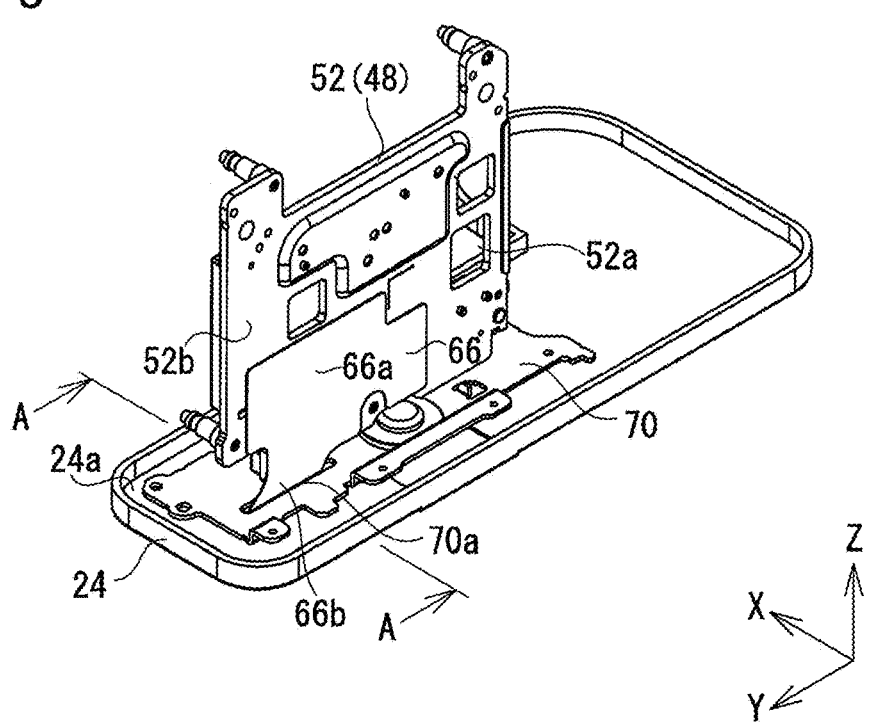
FIG. 8 is a perspective view illustrating thermal connection between a main base of the imaging module and a casing.
Figure 9:
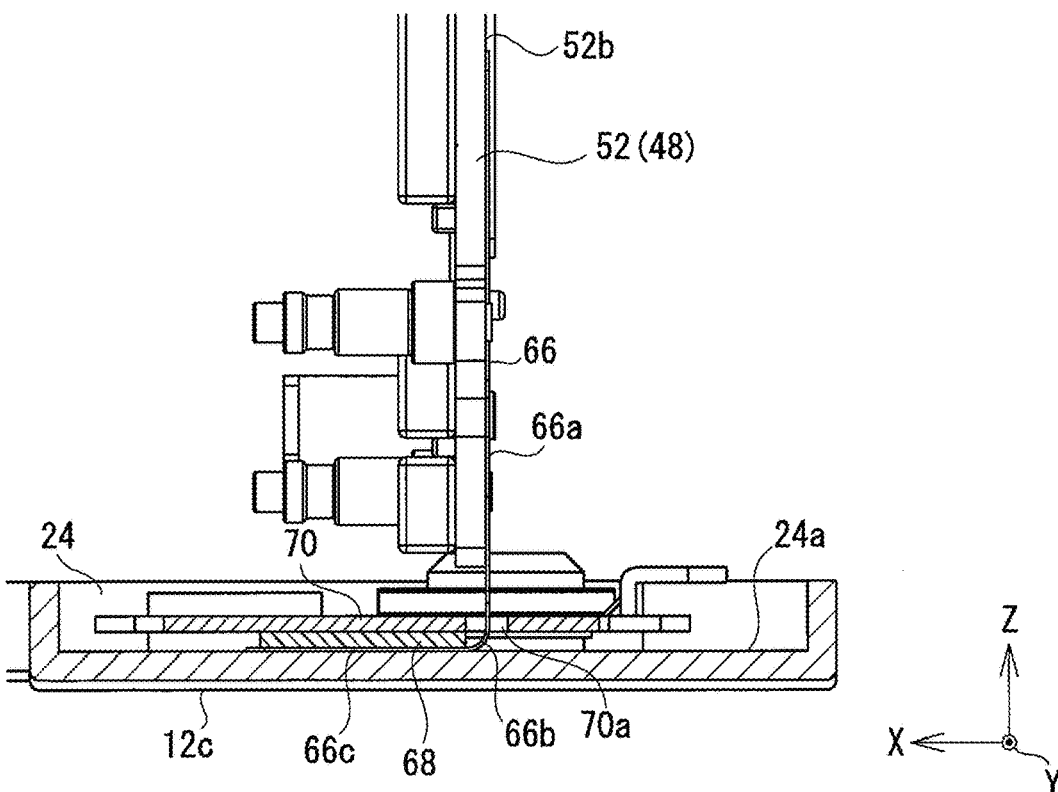
FIG. 9 is a cross-sectional view taken along line A-A of FIG. 8.

FIG. 8 is a perspective view illustrating thermal connection between the main base of the imaging module and the casing. FIG. 9 is a cross-sectional view taken along line A-A of FIG. 8.

As illustrated in FIGS. 8 and 9, the rear frame 52 of the main base 48 in the imaging module 40 is thermally connected, via a thermally conductive sheet 66, to an inner surface 24*a* opposite to the bottom surface 12*c* of the casing 12. In the case of the present embodiment, the inner surface 24*a* of the bottom casing 24 in the casing 12 and the rear surface 52*b* of the rear frame 52 are thermally connected to each other via the thermally conductive sheet 66.

The thermally conductive sheet 66 is a thin sheet having a thermally conductive property and flexibility, and is, for example, a graphite sheet. The thermally conductive sheet 66 includes a main body portion 66*a* affixed to the rear surface 52*b* of the rear frame 52 and a tongue piece portion 66*b* extending from the main body portion 66*a*. A tip end portion 66*c* of the tongue piece portion 66*b* is in contact with the inner surface 24*a* of the bottom casing 24.

The main body portion 66*a* of the thermally conductive sheet 66 is fixed to the rear surface 52*b* of the rear frame 52, whereas the tip end portion 66*c* is not fixed to the inner surface 24a of the bottom casing 24. Thus, the bottom casing 24 is repeatedly attachable to and detachable from the front casing 22 and the rear casing 28 without damaging the thermally conductive sheet 66. That is, the tip end portion 66c of the thermally conductive sheet 66 is in contact with the inner surface 24a of the bottom casing 24 in a separable manner.

In order to make contact with the inner surface 24a of the repeatedly attachable and detachable bottom casing 24 at a constant contact pressure, the tip end portion 66c of the thermally conductive sheet 66 is biased by an elastic member 68 as illustrated in FIG. 9. The elastic member 68 is an elastically deformable member, and is, for example, sponge, rubber, a plate spring, or the like.

Specifically, when the bottom casing 24 is in a state of being attached to the front casing 22 and the rear casing 28, the elastic member 68 continues to bias the tip end portion 66c of the thermally conductive sheet 66 toward the inner surface 24a of the bottom casing 24. As a result, contact between the tip end portion 66c of the thermally conductive sheet 66 and the inner surface 24a of the bottom casing 24 is maintained, that is, thermal connection therebetween is maintained.

As illustrated in FIG. 9, a rigid member 70 functioning as a retainer member receiving the elastic member 68 is provided inside the casing 12. In the case of the present embodiment, the rigid member 70 is a member that improves rigidity of the casing 12, particularly rigidity of the bottom casing 24. The rigid member 70 is formed with the screw hole 16, illustrated in FIG. 2, to which a tripod or the like is to be attached.

Specifically, as illustrated in FIG. 9, the rigid member 70 is provided inside the casing 12 to face the inner surface 24a of the bottom casing 24 at a distance therefrom. The tip end portion 66c of the thermally conductive sheet 66 is arranged between the inner surface 24a of the bottom casing 24 and the rigid member 70. The elastic member 68 is arranged between the tip end portion 66c of the thermally conductive sheet 66 and the rigid member 70. When the bottom casing 24 is in a state of being attached to the front casing 22 and the rear casing 28, the elastic member 68 is compressed and deformed by being sandwiched between the bottom casing 24 and the rigid member 70. As a result, the contact between the tip end portion 66c of the thermally conductive sheet 66 and the inner surface 24a of the bottom casing 24 is maintained. The elastic member 68 is affixed to the rigid member 70 via a double-sided tape (not illustrated). The tip end portion 66c of the thermally conductive sheet 66 is affixed to the elastic member 68 via a double-sided tape (not illustrated).

In the case of the present embodiment, the thermally conductive sheet 66 passes through a through hole 70a formed in the rigid member 70. Specifically, the tongue piece portion 66b of the thermally conductive sheet 66 passes through the through hole 70a, and the tongue piece portion 66b having passed therethrough is bent. Accordingly, the tip end portion 66c of the thermally conductive sheet 66 is arranged between the inner surface 24a of the bottom casing 24 and the rigid member 70 to be along the rigid member 70. By causing the thermally conductive sheet 66 to pass through the through hole 70a, the rear frame 52 of the imaging module 40 and the bottom casing 24 can be thermally connected to each other with the shortest distance.

According to such thermal connection and corresponding structures, heat generated from the image sensor 42 during imaging is transferred to the board holder 46 directly and is also transferred to the board holder 46 via the board 44. The heat of the board holder 46 is transferred to the rear frame 52 of the main base 48 mainly via the thermally conductive sheet 64. The heat of the rear frame 52 is transferred to the bottom casing 24 via the thermally conductive sheet 66. Then, the heat of the bottom casing 24 is dissipated to the outside via an outer surface of the bottom casing 24, that is, the bottom surface 12c of the casing 12. As a result, the image sensor 42 is cooled.

Note that in the case of the present embodiment, heat is dissipated via the bottom surface 12c among the plurality of outer surfaces of the casing 12 of the imaging apparatus 10. In the case of the present embodiment, there is a possibility that the left hand of the user gripping the lens mounted to the lens mount 14 touches the front surface 12a of the casing 12. In addition, in the left side end portion 12b of the casing 12, the grip portion to be gripped by the right hand of the user exists. Further, the face of the user looking into the electronic viewfinder 21 approaches the rear surface 12e of the casing 12. Furthermore, the top surface 12d of the casing 12 is not suitable for heat dissipation because there is a plurality of buttons such as the shutter button 18 that the user touches. For these reasons, the bottom surface 12c of the casing 12 is used for heat dissipation because the bottom surface 12c of the casing 12 is less likely to be subjected to an approach or a touch made by a part of the body of the user than other portions.

According to the present embodiment as described above, in an imaging apparatus in which a heat dissipation member thermally connectable to an image sensor via a thermally conductive sheet does not exist inside a casing, it is possible to cause heat of the image sensor to be dissipated to the outside of the casing.

Although the embodiment of the present disclosure has been described with reference to the embodiment described above, the embodiments of the present disclosure are not limited to the embodiment described above.

For example, in the case of the embodiment described above, the imaging apparatus 10 has an image stabilization function, that is, the image sensor 42 can be displaced in the direction orthogonal to the optical axis C. However, the embodiment of the present disclosure is not limited to this embodiment. The imaging apparatus according to an embodiment of the present disclosure may be an imaging apparatus that does not have an image stabilization function, that is, an imaging apparatus that has a structure in which the image sensor is not displaced.

Further, in the case of the embodiment described above, the casing 12 of the imaging apparatus 10 includes four members, that is, the front casing 22, the bottom casing 24, the top casing 26, and the rear casing 28. However, the embodiment of the present disclosure is not limited to this embodiment. The configuration of the casing of the imaging apparatus is not limited as long as the casing at least partially includes a metal part and the metal part forms at least a part of the outer surface of the casing.

Further, in the case of the embodiment described above, the heat generated from the image sensor disposed inside the casing 12 of the imaging apparatus 10 is finally dissipated to the outside from the bottom surface 12c of the casing 12. However, this configuration is made because the imaging apparatus 10 has a design similar to the design of a so-called single-lens reflex camera. For example, in the case of an imaging apparatus having a design different from the design of a single-lens reflex camera, a part of the casing from which heat generated from the image sensor is dissipated to the outside is not limited to the bottom surface.

That is, in a broad sense, an imaging apparatus according to an embodiment of the present disclosure includes: a casing at least partially including a metal part, an outer surface of the casing including at least a part of which is formed by the metal part; a lens mount provided on a front surface of the casing; an image sensor provided inside the casing, the image sensor being positioned rearward of the lens mount; a thermally conductive sheet that transfers heat generated from the image sensor, to the metal part of the casing; and an elastic member biasing the thermally conductive sheet toward an inner surface of the metal part of the casing to maintain contact between the thermally conductive sheet and the inner surface.

As described above, the above embodiments have been described as examples of the techniques in the present disclosure. For this purpose, the drawings and detailed description are provided. Accordingly, the components described in the drawings and the detailed description may include not only components necessary for solving the problem but also components unnecessary for solving the problem in order to illustrate the techniques described above. Therefore, it should not be immediately recognized that these unnecessary components are necessary on the basis of the fact that these unnecessary components are described in the drawings and the detailed description.

Since the embodiments described above are intended to illustrate the techniques in the present disclosure, various changes, replacements, additions, omissions, and the like can be made within the scope of the claims or equivalents thereof.

The present disclosure is applicable to an imaging apparatus in which at least a part of a casing is made of a metal material.

What is claimed is:

1. An imaging apparatus comprising:
a casing at least partially including a metal part, an outer surface of the casing including at least a part of which is formed by the metal part;
a lens mount provided on a front surface of the casing;
an image sensor provided inside the casing, the image sensor being positioned rearward of the lens mount;
a thermally conductive sheet that transfers heat generated from the image sensor, to the metal part of the casing;
an elastic member biasing the thermally conductive sheet toward an inner surface of the metal part of the casing to maintain contact between the thermally conductive sheet and the inner surface; and
a retainer member provided inside the casing to face the inner surface at a distance from the inner surface, the retainer member receiving the elastic member, wherein
the thermally conductive sheet includes a tip end portion entering between the inner surface and the retainer member,
the elastic member is arranged between the retainer member and the tip end portion of the thermally conductive sheet,
the retainer member is provided with a through hole through which the thermally conductive sheet passes, and
the tip end portion is arranged between the inner surface and the retainer member by bending a part of the thermally conductive sheet having passed through the through hole.

2. The imaging apparatus according to claim 1, wherein the metal part forms at least a part of a bottom surface of the casing.

3. The imaging apparatus according to claim 2, wherein
the casing includes a bottom casing, the bottom casing including the bottom surface of the casing, the bottom casing being detachable, and
the metal part is the bottom casing.

4. An imaging apparatus comprising:
a casing at least partially including a metal part, an outer surface of the casing including at least a part of which is formed by the metal part;
a lens mount provided on a front surface of the casing;
an image sensor provided inside the casing, the image sensor being positioned rearward of the lens mount;
a thermally conductive sheet that transfers heat generated from the image sensor, to the metal part of the casing;
an elastic member biasing the thermally conductive sheet toward an inner surface of the metal part of the casing to maintain contact between the thermally conductive sheet and the inner surface;
a board on which the image sensor is mounted;
a board holder holding the board; and
a main base holding the board holder such that the board holder is displaceable,
wherein the thermally conductive sheet includes a part affixed to the main base.

5. The imaging apparatus according to claim 4, wherein the metal part forms at least a part of a bottom surface of the casing.

6. The imaging apparatus according to claim 5, wherein
the casing includes a bottom casing, the bottom casing including the bottom surface of the casing, the bottom casing being detachable, and
the metal part is the bottom casing.

* * * * *